United States Patent [19]

Sircar

[11] Patent Number: 4,705,541
[45] Date of Patent: Nov. 10, 1987

[54] PRODUCTION OF MIXED GASES OF CONTROLLED COMPOSITION BY PRESSURE SWING ADSORPTION

[75] Inventor: Shivaji Sircar, Wescosville, Pa.

[73] Assignee: Air Products and Chemicals, Inc., Allentown, Pa.

[21] Appl. No.: 13,754

[22] Filed: Feb. 12, 1987

[51] Int. Cl.$^4$ .............................................. B01D 53/04
[52] U.S. Cl. ......................................... 55/26; 55/58; 55/62; 55/68
[58] Field of Search ................... 55/26, 25, 58, 62, 68, 55/74, 75

[56] References Cited

U.S. PATENT DOCUMENTS

| | | | |
|---|---|---|---|
| 3,226,913 | 1/1966 | Avery | 55/25 |
| 3,720,042 | 3/1973 | Simonet | 55/25 |
| 4,077,779 | 3/1978 | Sircar et al. | 55/25 |
| 4,129,424 | 12/1978 | Armond | 55/25 |
| 4,333,744 | 6/1982 | Fuderer | 55/25 |
| 4,512,780 | 4/1985 | Fuderer | 55/26 |
| 4,515,605 | 5/1985 | Inoue et al. | 55/62 X |
| 4,599,094 | 7/1986 | Werner et al. | 55/26 |

FOREIGN PATENT DOCUMENTS 193716  9/1986  European Pat. Off. ............... 55/25

Primary Examiner—Kathleen J. Prunner
Attorney, Agent, or Firm—G. L. Chase; J. C. Simmons; W. F. Marsh

[57] ABSTRACT

Adjusted gas compositions having two or more components in desired proportions for particular industrial uses are obtained from available feed gas mixtures accompanied by recovery of one or more valuable individual gases of high purity, by a novel selective adsorption-desorption scheme carried out in a multi-column PSA system. Following initial adsorption of one or more components from the feed gas mixture at high pressure the sorbate-laden column is subjected to a high pressure rinse using as rinse gas the previously recovered more strongly adsorbed species. After the rinsing step, the column is depressured to a selected level and purged with part of the unsorbed gas effluent discharged during the initial adsorption step until a preset amount of the earlier sorbed gas is recovered in the purge effluent as the readjusted binary gas mixture of desired proportions. As an example, there is disclosed the production from a starting gas mixture rich in hydrogen and carbon monoxide, such as that obtained from steam-methane reforming, an industrially useful gas mixture having a desired $H_2/CO$ ratio with the accompanying individual recovery of high purity hydrogen and carbon monoxide as by-products.

10 Claims, 1 Drawing Figure

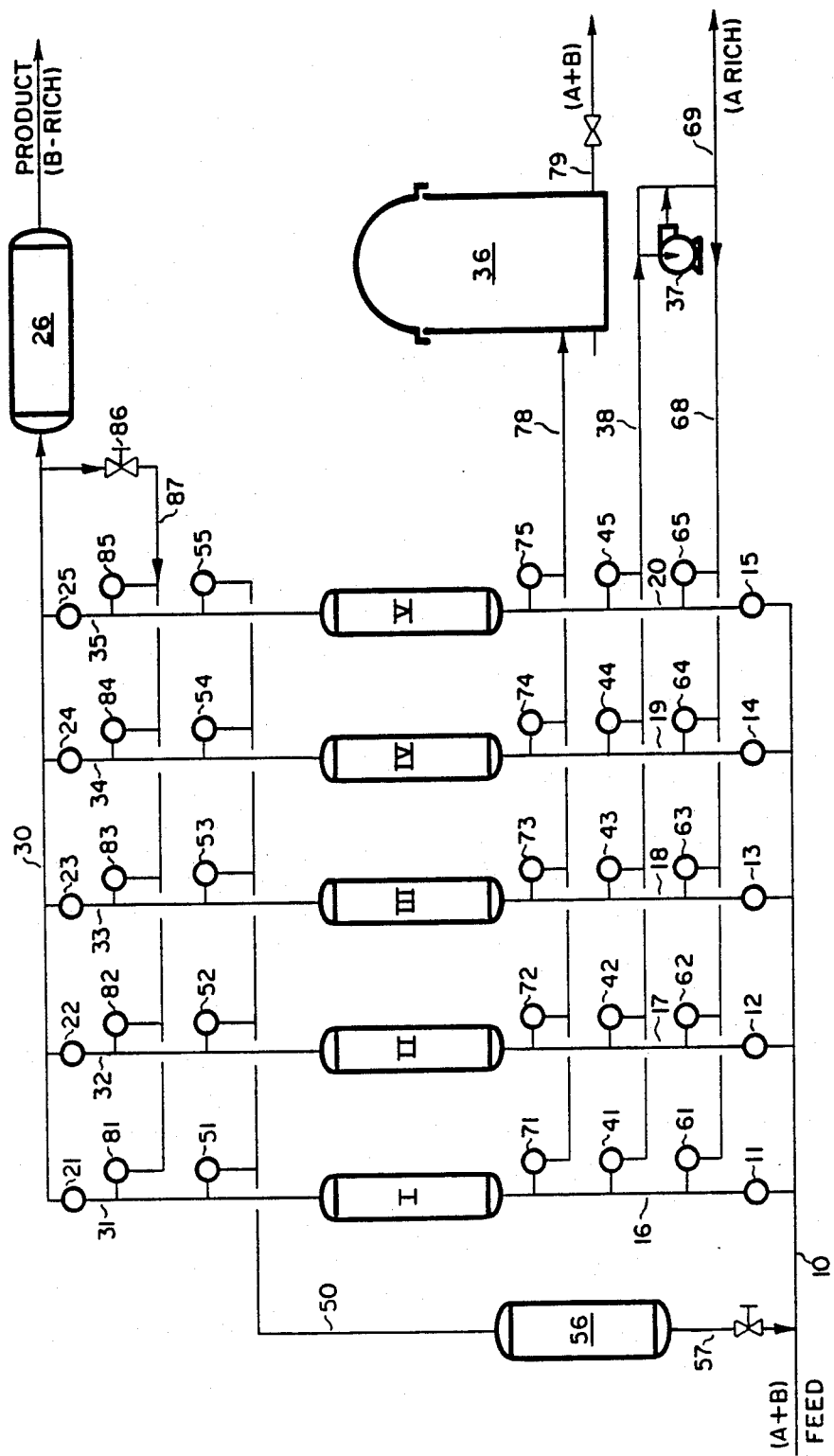

PRODUCTION OF MIXED GASES OF CONTROLLED COMPOSITION BY PRESSURE SWING ADSORPTION

TECHNICAL FIELD

The present invention is concerned with pressure swing adsorption processes; more particularly with processes designed for readjusting the composition of an available gas mixture to obtain in single stage operation a product gas of desired specific composition and one or more individual pure or nearly pure gas components as by-products.

BACKGROUND OF THE INVENTION

It is often desirable to adjust the composition of an available gas mixture to obtain a mixed product gas blend desired for a particular use. While the desired gas composition can more or less often be produced by separating individual components of an available gas mixture and remixing these separated components in desired proportions, such procedure is not always easily or successfully practicable using the conventional chemical unit operations. Furthermore, the economics of such approach may be impractical.

Selective adsorption of one or more components of an available gas mixture has been advocated in certain instances in attempts to achieve the state goal, U.S. Pat. No. 3,720,042, for example, is directed to a PSA process for recovering from a starting mixed gas comprising these, (1) a pure hydrogen product and (2) a mixed stream comprised of hydrogen and carbon monoxide in definite proportions. The patent method involves selective adsoprtion of carbon monoxide from the feed gas to provide pure hydrogen as the collected primary effluent. The sorbed CO fraction is then recovered by vacuum desorption and mixed with untreated starting gas mixture to provide the mixed stream of desired $H_2$/CO molar ratio.

In U.S. Pat. No. 4,077,779, of applicant and another inventor PSA systems and methods are described applicable to bulk separation of hydrogen from a mixed gas also containing $CO_2$ and/or $CH_4$. The disclosed separation is carried out an in an arrangement of 4, 5 or 6 parallel adsorbent beds, each undergoing a sequence of operations: (a) adsorption of components from the mixed gas feed while recovering unadsorbed hydrogen; (b) rinsing the sorbate-laden bed with a recompressed stream of secondary gas ($CO_2$), then (c) gas withdrawal to reduce bed pressure to an intermediate level, followed by (d) purging with extraneous gas, (e) evacuation to subatmospheric pressure level and (f) repressuring to superatmospheric level by recycle of hydrogen.

SUMMARY OF THE INVENTION

In accordance with the present invention a novel pressure swing adsorption scheme is provided for efficient readjustment of the composition of a gas mixture by partial adsorption of certain components of the mixture. In addition, the invention provides an opportunity to separate one or more individual components of the feed gas mixture in relative pure form as by-product(s), which can not be achieved by the known methods previously proposed.

The invention may be practiced in a multi-column PSA system wherein each column is packed with a bed of adsorbent which is selective in retaining one of the components (A) of the feed gas, while permitting the major portion of the less selectively adsorbed component(s) B or B and C to pass through and discharge from the column. Each column of the system goes through a designed cycle having the following steps in sequence:

(a) ADSORPTION—Mixed gas feed is passed through the onstream column at superatmospheric pressure until the concentration of the preferentially adsorbed component (A) appears in the column effluent and reaches an acceptable maximum limit. The primary effluent is rich in the less selectively adsorbed components (B) or (B) and (C).

(b) HIGH PRESSURE RINSE—Using a previously recovered essentially pure portion of the preferentially adsorbed component (A) the column that has completed the adsorption stroke (a) is rinsed at the prevailing high pressure until the whole column is nearly saturated with the rinse gas. The rinse effluent during this step is recycled as feed and mixed with the fresh feed then being introduced into a column undergoing the adsorption step (a).

(c) DEPRESSURING—Gas is withdrawn from the column saturated with A component until the column is brought to near ambient pressure level or to a pressure level of P. The column effluent during the step is rich in the sorbed component (A). Part of this effluent is compressed to about the pressure of the adsorption step (a) and employed for the high pressure rinse step (b).

(d) PURGE—The column that has been depressured to near ambient level or to a pressure level of P is then purged with part of the B-rich or B+C-rich gas produced as primary effluent at the depressurized pressure level. The purge is continued until a preset amount of the more readily sorbed gas (A) is removed from the column. The column effluent from this step is the readjusted gas composition (A+B) or (A+B+C) of desired proportions of components contained therein, which proportions are controlled by the temperature and pressure employed in the initial adsorption step (a) and the amount of the purge gas employed, which purge gas is rich in the less selectively adsorbed component (B) or (B)+(C).

(e) REPRESSURIZING—Following the purge step (d) the purged column is pressurized to adsorption pressure level with part of the primary effluent from step (a) which is rich in component B or B+C, and the cycle of steps is repeated, starting with step (a). Each of the columns, in turn, undergoes the recited sequence.

The method for practicing the invention will be better understood and certain of its advantages appreciated from the detailed description below read in connection with the accompanying drawing.

BRIEF DESCRIPTION OF THE DRAWING

The accompanying drawing is a schematic flow diagram illustrative of a system adapted for practice of the invention, employing five adsorption columns operated in parallel.

DETAILED DESCRIPTION OF THE INVENTION

The operating sequence for practice of the invention can be beneficially applied in producing adjusted gas mixtures having two or more components in desired proportions, from readily available gas mixtures. Thus, the invention provides the opportunity to produce a large spectrum of readjusted gas compositions having desired particular uses in industry, in addition to the production of valuable relatively pure components as by-products when the initial feed gas mixture contains accompanying components in excess of that needed in the readjusted mixed gas product.

Among the important gas mixtures in which the process of the invention can be beneficially employed is the separation of $CO/H_2$ from a gas stream rich in these components and which may contain minor amounts of accompanying impurities. By the technique of the invention there can be obtained, for example, a valuable binary gas mixture of desired composition such as that commonly employed in OXO synthesis (hydroformulation reactions) and those used in Fischer-Tropsch synthesis ($1.1\ H_2 + 1.0\ CO$), in addition to recovery of individual streams of high purity CO and high purity $H_2$. Another example of a gas mixture to which the invention can be advantageously applied is that of separating a gas mixture rich in $N_2$ and $H_2$, obtaining an adjusted $N_2/H_2$ mixture useful in ammonia synthesis, in addition to providing separate essentially pure streams of nitrogen and hydrogen.

The distinguishing features of the invention are generally applicable to a wide variety of available starting gas mixtures. These features reside in a PSA scheme including (1) a high pressure rinse step using the more strongly adsorbed species, (2) a desorption step producing the previously adsorbed species as a by-product of high purity, (3) controlled purge following the desorption step at the pressure level of depressurized column using as purge gas the less strongly adsorbed species, to produce the readjusted binary product stream of desired composition.

Assuming that the process of the invention is to be employed in the production of a synthesis gas comprised of $H_2$ and CO, one may employ as an available starting mixture the product from steam methane reforming (SMR) or off-gas from partial oxidation of hydrocarbons (POX). After removal of $CO_2$ from the starting gas in any known manner, as by selective adsorption in solid adsorbent or absorption in a liquid solvent (such as in monoethanolamine) or by selective permeation through a membrane, the residual gas will be chiefly composed of CO and $H_2$, with very dilute amounts of $CH_4 + N_2 + Ar$ and trace quantities of $CO_2$. A typical composition of the starting gas (after $CO_2$ removal) is 52.4% CO; 47.0% $H_2$ and 0.6% of a mixture of $CH_4 + N_2 + Ar$. A PSA system having a plurality of adsorbent columns in parallel may be employed in the separation of the gas mixture, such as that illustrated in the drawing. Each of the columns is packed with an adsorbent selective to retain CO while permitting unadsorbed hydrogen to pass through the adsorbent bed. Among the adsorbents that can be employed for this purpose are: zeolites A, X, Y or mordenite in a single cation exchanged or binary cation exchanged form containing ions from Groups I and II of the periodic table. Activated carbons designed for selective adsorption of CO can also be used.

The invention may be practiced in various arrangements employing three or more columns of suitable adsorbent operated in parallel and having pre-set time periods for each of the steps of the operating cycle. The system illustrated in the drawing utilizes five such adsorbent columns labeled I, II, III, IV and V wherein each of the columns, in turn, undergoes the same sequence of operations during the assigned time cycle, to wit:

(a) Selective adsorption (Ads) of one or more of the principal components of the feed gas at superatmospheric pressure while discharging as primary effluent the unsorbed portion (B or B+C-rich product) at nearly feed pressure.

(b) High pressure rinse (HPR) co-current to feed direction, using a stream essentially rich in a previously sorbed component (A). The rinse effluent is recycled as feed through tank 56.

(c) Countercurrent depressurization (Dep) of the rinsed column to near ambient or an intermediate pressure level (P). Part of the desorbed gas is withdrawn as product rich in component A and part thereof is recompressed to feed pressure level and sent to a column then undergoing step (b).

(d) Countercurrent purge (LP Purge) of the depressured column at near ambient pressure or at a pressure P with part of the B or B+C-rich product from step (a) to produce a mixture consisting essentially of A and B (or B+C) components of the feed gas, which mixture is collected in mixing/surge tank 36.

(e) Countercurrent repressurization (Rep) to of the purged column to feed pressure level using part of the B or B+C-rich product (primary effluent) from step (a).

The repressured column is now ready for repetition of the sequence of steps (a) through (e).

The principal gas flow manifold and control valves for practice of the invention in the illustrated embodiment of the drawing is summarized in Table 1 below.

TABLE 1

| MANIFOLDS | | VALVES |
|---|---|---|
| 10 | Feed inlet | 11–15 |
| 30 | B or B + C-rich product | 21–25 |
| 68 | A-rich rinse gas | 61–65 |
| 38 | A-rich desorption | 41–45 |
| 50 | High Pressure Rinse effluent | 51–55 |
| 87 | B or B + C-rich purge or pressurization | 81–85 |
| 78 | Low Pressure Rinse effluent | 71–75 |

In practice of the invention employing the illustrated five column system, a feed stream composed of hydrogen and carbon monoxide, and which may also contain a small amount of accompanying impurities (as above indicated) is charged at the designed superatmospheric pressure from feed manifold 10 into one of the adsorption columns then on the adsorption stroke of the cycle. Thus, if column I is then on-stream, the feed gas mixture is introduced into column I through open valve 11 in line 16. Carbon monoxide is preferentially retained in the bed of adsorbent and an effluent stream of substantially pure hydrogen is discharged into manifold 30 via open valve 21 in line 31. All other valves associated with column I remain closed during the time period that column I is on the adsorption step of the cycle.

Introduction of feed gas and withdrawal of the hydrogen-rich primary effluent is continued for a predetermined fixed time period, which is short of that resulting in breakthrough of acceptable level of carbon monoxide in the effluent. The time periods desired for each of the steps in the cycle having been previously determined, these are pre-set and controlled in known manner by a cycle timer or an analyzer-computer system which senses the breakthrough CO limit.

At the completion of the designed adsorption step in column I, valves 11 and 21 are closed and the feed introduction switched to a companion column which has been brought to adsorption pressure as will hereinafter be described. Thus, each of the columns II through V, in turn will receive mixed gas from manifold 10, through its associated line 17, 18, 19, 20, respectively, and discharge hydrogen-rich product into manifold 30, respectively through associated line 32, 33, 34 or 35. The bed of adsorbent in column I at the termination of the adsoprtion step is next subjected to (b) rinse with essentially pure CO at substantially the initial feed pressure. This is carried out by flow of the CO rinse gas through the column in the same direction that the feed gas was earlier introduced. Thus, all or a portion of the gas is withdrawn from line 38 into compressor 37 and discharged at the desired pressure into line 16 via connecting line 68, valve 61 being open. The effluent from column I during this step includes voids and displaced gases from the bed and is of a composition similar to that of the initial feed gas. The rinse effluent from column I is discharged into line 50 through then open valve 51 into a mixing tank 56 and mixed with the fresh feed entering another column via manifold 10. The use of the mixing tank 56 may not be necessary for some applications.

The co-current rinse (b) is terminated by closing valves 51 and 61 and countercurrent depressurization (c) of column I is initiated to bring the column to near ambient pressure or to a pressure level of P. This is brought about by opening valve 41 through which gas rich in component A is discharged from column I into manifold 38, from which gas part may be withdrawn (as indicated at 69) as A-rich product and the remainder (which is also recompressed to feed pressure level by compressor 37) used to rinse a companion column then on step (b). The recompressed gas is fed to the companion column from manifold 68 and the proper one of the connecting valves 62 to 65.

While column I is at or near ambient pressure level or at a pressure level of P it is purged (d) with part of the product gas rich in component B or B+C, produced during step (a). This purge effluent is discharged into purge tank 36 via open valve 71 and manifold 78. The effluent is a mixture consisting essentially of A and B or A and (B+C) components initially present in the feed gas. The mixed gas can be withdrawn from tank 36 via line 79. The gas used for the low pressure purge is supplied from manifold 30 through opened valve 81 and 86. The composition of this purge effluent is different from that of the feed gas mixture and it constitutes the product gas of altered composition.

Following the purge of column I, it is restored to feed pressure level by countercurrent repressurization with part of the B or (B+C)-rich product gas directly from manifold 30 and/or from storage vessel 26. During this step valve 71 is closed while valve 81 remains open.

Although not limited thereto, the process of the invention can be carried out in an operating cycle in which each of the sequential steps occupies an equal time interval. Thus, for a postulated 15 minute cycle each of the five steps (a) through (e) would be operated for a three minute period. With a five column PSA system, such as that illustrated in the Figure, each of the other columns II through V in turn goes through the same sequence of steps as above described for column I.

An operative order of these steps for the several columns is shown in Table 2 and the particular valve openings are there identified.

TABLE 2

| Operation | Open Valve | | | | |
|---|---|---|---|---|---|
| | I | II | III | IV | V |
| Ads | 11,21 | 12,22 | 13,23 | 14,24 | 15,25 |
| HPR | 61,51 | 62,52 | 63,53 | 64,54 | 65,55 |
| Dep | 41 | 42 | 43 | 44 | 45 |
| LP Purge | 81,71 | 82,72 | 83,73 | 84,74 | 85,75 |
| Rep | 81 | 82 | 83 | 84 | 85 |

In the foregoing description the practice of the invention was exemplified in its application to recovery from a gas mixture containing these components, essentially pure hydrogen and essentially pure carbon monoxide, as well as an industrially useful mixed gas comprised of these components in desired proportions. The relative proportions of hydrogen and carbon monoxide can be adjusted by controlling operating conditions including particularly the pressure and temperature at which the initial adsorptive fractionation of the feed gas is carried out and the amount of the hydrogen-rich product (component B or B+C) employed as low pressure purge gas in the countercurrent purge step (d) of the cycle. The amount of such purge gas can be controlled by adjusting flow rate through valve 86.

Assuming that the starting mixed gas composition is that obtained by steam-methane reforming (SMR) of natural gas or off-gas from partial oxidation of hydrocarbons (POX) from which the $CO_2$ component has been selectively removed by known methods, the remaining gas mixture will comprise roughly equal parts by volume of hydrogen and CO and usually no more than about up to 1% of one or more accompanying contaminants such as methane, nitrogen and argon. In treating the gas mixture in accordance with the invention there is obtained substantially pure hydrogen (97 to 99% $H_2$) as the B component collected in storage vessel 26, and as the A component a product stream of high purity carbon monoxide (97 to 99%) withdrawn from the system via line 69. A valuable mixed gas composed of controlled amounts of hydrogen and carbon monoxide (A+B) is also produced by use of part of the separated hydrogen in purging the sorbed CO from the adsorbent bed, collected in tank 36 and discharged therefrom by line 79. By controlling the amount of purge gas permitted to flow into manifold 87 by adjusting valve 86 with reference to the determined amount of removable hydrogen available in the column purged, gas mixtures of the desired $H_2/CO$ ratio can be directly obtained. Examples of such industrially useful mixtures include that used in OXO alcohol synthesis (0.8–2.5 $H_2/CO$ ratio) and in Fischer-Tropsch synthesis (1.1 to 1.0 $H_2/CO$ ratio).

The preferred range of adsorption pressure and temperature for $CO/H_2$ and $N_2/H_2$ separations are 20–600 psig and 0°–60° C., respectively. The low pressure purges is preferentially carried out in the 0–20 psig level. The preferred adsorbent for $N_2/H_2$ separation is the same class of zeolites described earlier in this case. The $N_2$ constitutes component (A) of the feed mixture and $H_2$ constitutes the component (B). The purge effluent product gas in this case has a composition desired for ammonia synthesis.

What is claimed:

1. In the production of a binary gas mixture of desired fixed proportions of components from a starting feed gas containing such components, the method which comprisees the steps of
    (a) passing the feed gas at superatmospheric pressure into a bed of solid adsorbent preferentially selective in retention of a first of said components, while discharging from said bed as primary effluent a stream consisting essentially of the unadsorbed or less selectively adsorbed second component;
    (b) while said bed is at about the aforesaid superatmospheric pressure, discontinuing said feed gas introduction and rinsing the bed, in a direction co-current to that of the feed gas introduction, with a gas stream rich in said preferentially retained first component;
    (c) withdrawing contained gas from said bed until said bed is depressurized to about a pressure level P and compressing at least a part of the gas so withdrawn to about superatmospheric level for use as rinsing gas in step (b);
    (d) while at about said pressure level of P, purging the bed with a controlled amount of the gas discharged as primary effluent during step (a), thereby producing a purge effluent as the binary gas mixture of desired fixed proportions of components; and thereafter
    (e) repressuring the bed to the initial superatmospheric pressure level of step (a) for repetition of the recited sequence of steps, said repressuring being effected with part of the primary effluent from step (a).

2. The method as defined in claim 1 wherein said starting feed gas contains principally hydrogen and carbon monoxide.

3. The method as defined in claim 2 wherein said starting feed gas is one consisting essentially of hydrogen and carbon monoxide in substantially equal proportions.

4. The method as defined in claim 2 wherein said starting feed gas is one derived from a steam methane reforming product, from which product contained carbon dioxide was first removed.

5. The method as defined in claim 2 wherein said method is practiced in a PSA system comprising a plurality of such beds of solid adsorbent operated in parallel.

6. The method as defined in claim 2 wherein the pressure level P is between 0–20 psig.

7. The method as defined in claim 1 wherein said preferentially adsorbed component is carbon monoxide and said unadsorbed second component consists essentially of hydrogen, and the controlled amount of said second component employed in step (d) is that resulting in a purge effluent comprising about 0.5–2.5 moles of hydrogen per mole of carbon monoxide.

8. The method as defined in claim 1 wherein said starting feed gas contains principally hydrogen and nitrogen.

9. The method as defined in claim 1 wherein the purge of step (d) is countercurrent to the feed of step (a).

10. The method as defined in claim 1 wherein the pressure P of step (c) is ambient pressure.

* * * * *